US010069660B1

(12) United States Patent
Sun et al.

(10) Patent No.: US 10,069,660 B1
(45) Date of Patent: Sep. 4, 2018

(54) LOW POWER SERDES ARCHITECTURE AND PROTOCOL

(71) Applicant: CREDO TECHNOLOGY GROUP LIMITED, Grand Cayman (KY)

(72) Inventors: Junqing Sun, Fremont, CA (US); Haoli Qian, Fremont, TX (US); Lawrence Chi Fung Cheng, San Jose, CA (US)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 15/487,045

(22) Filed: Apr. 13, 2017

(51) Int. Cl.
*H04B 1/38* (2015.01)
*H04L 25/03* (2006.01)
*H04L 7/00* (2006.01)
*H04L 1/00* (2006.01)
H04L 12/707 (2013.01)

(52) U.S. Cl.
CPC ...... *H04L 25/03885* (2013.01); *H04L 1/0071* (2013.01); *H04L 7/0087* (2013.01); *H04L 25/03006* (2013.01); *H04L 25/03057* (2013.01); *H04L 45/24* (2013.01)

(58) Field of Classification Search
CPC ............. H04L 25/03885; H04L 1/0071; H04L 7/0087; H04L 25/03006; H04L 25/03057; H04L 45/24
USPC .......................................................... 375/219
See application file for complete search history.

(56) References Cited

U.S. PATENT DOCUMENTS

| 9,385,859 B2 * | 7/2016 | Kuan .................... H04L 7/0087 |
| 2012/0044951 A1 * | 2/2012 | Han ....................... H04L 69/323 |
| | | 370/419 |
| 2013/0343400 A1 | 12/2013 | Lusted et al. |
| 2014/0086264 A1 | 3/2014 | Lusted et al. |
| 2014/0146833 A1 | 5/2014 | Lusted et al. |

(Continued)

OTHER PUBLICATIONS

"Physical Coding Sublayer (PCS) for 64B/66B, type 50GBASE-R," Draft Amendment to IEEE Std 802.3-2015, Feb. 3, 2017, pp. 132-141, 10 pgs.

(Continued)

*Primary Examiner* — Helene Tayong
(74) *Attorney, Agent, or Firm* — Ramey & Schwaller, LLP

(57) ABSTRACT

An illustrative multi-lane communication method includes: (a) receiving receive signals on different receive channels; (b) converting each of the receive signals into a lane of a multi-lane receive data stream, wherein said converting includes demodulation and error measurement; (c) determining remote pre-equalizer adaptation information based in part on the error measurement; (d) detecting alignment markers in the multi-lane receive data stream; (e) extracting local pre-equalizer adaptation information in, or proximate to, the alignment markers in the multi-lane receive data stream; (f) using the local pre-equalizer adaptation information to adjust coefficients of a local pre-equalization filter; (g) periodically inserting an alignment marker in a multi-lane transmit data stream, wherein the remote pre-equalizer adaption information is included in, or inserted proximate to, the alignment markers; and (h) transforming each lane of the multi-lane transmit data stream into a transmit signal, wherein said transforming includes modulating and applying the local pre-equalization filter.

20 Claims, 6 Drawing Sheets

(56) References Cited

U.S. PATENT DOCUMENTS

2015/0003505 A1* 1/2015 Lusted ............... H04L 25/4917
375/224
2016/0337114 A1* 11/2016 Baden .................. H04J 3/0697

OTHER PUBLICATIONS

"Physical Medium Attachment (PMA) sublayer, Physical Medium Dependent (PMD) sublayer, and baseband medium, type 100GBASE-KP4," IEEE Standard for Ethernet, Section Six, pp. 481-519, 39 pgs.

"Physical Medium Dependent (PMD) sublayer and baseband medium, type 50GBASE-CR, 100GBASE-CR2, and 200GBASE-CR4," Draft Amendment to IEEE Std 802.3-2015, Feb. 3, 2017, pp. 184-215, 32 pgs.

"Reed-Solomon Forward Error Correction (RS-FEC) sublayer for 50GBASE-R PHYs," Draft Amendment to IEEE Std 802.3-2015, Feb. 3, 2017, pp. 142-159, 18 pgs.

International Search Report and Written Opinion dated Dec. 6, 2017, in International Application No. PCT/CN17/75961.

"Physical Medium Attachment (PMA) sublayer, Physical Medium Dependent (PMD) sublayer, and baseband medium, type 100GBASE-KP4," IEEE Standard for Ethernet, Section Six, pp. 481-519, 33 pgs.

"Information technology—Open Systems Interconnection—Basic Reference Model: The Basic Model", IEEE International Standard, Second Edition Corrected and Reprinted, Jun. 15, 1996, 68 pgs.

* cited by examiner

LOW POWER SERDES ARCHITECTURE AND PROTOCOL

BACKGROUND

The Institute of Electrical and Electronics Engineers (IEEE) Standards Association publishes an IEEE Standard for Ethernet, IEEE Std 802.3-2015, which will be familiar to those of ordinary skill in the art to which this application pertains. This standard provides a common media access control specification for local area network (LAN) operations at selected speeds from 1 Mb/s to 100 Gb/s over coaxial cable, twisted wire pair cable, fiber optic cable, and electrical backplanes, with various channel signal constellations. As demand continues for ever-higher data rates, extensions to the standard must account for increased channel attenuation and dispersion even as the equalizers are forced to operate an ever-higher symbol rates, to the point that receiver power consumption and dissipation is expected to reach prohibitive levels. A different architecture may be needed to resolve this issue.

SUMMARY

Accordingly, there are disclosed herein a low-power serializer-deserializer (SerDes) architecture with a supporting communications protocol to provide adaptive equalization concurrently with ongoing multi-lane communications. In one illustrative embodiment, a multi-lane communication method includes: (a) receiving receive signals on different receive channels; (b) converting each of the receive signals into a lane of a multi-lane receive data stream, wherein said converting includes demodulation and error measurement; (c) determining remote pre-equalizer adaptation information based at least in part on the error measurement; (d) detecting alignment markers in each lane of the multi-lane receive data stream; (e) extracting local pre-equalizer adaptation information from the multi-lane receive data stream, said adaptation information being included in, or proximate to, the alignment markers in at least one lane of the multi-lane receive data stream; (f) using the local pre-equalizer adaptation information to adjust one or more coefficients of a local pre-equalization filter; (g) periodically inserting an alignment marker in each lane of a multi-lane transmit data stream, wherein the remote pre-equalizer adaption information is included in, or inserted proximate to, the alignment markers in at least one lane of the multi-lane transmit data stream; (h) transforming each lane of the multi-lane transmit data stream into a transmit signal, wherein said transforming includes modulating and further includes applying the local pre-equalization filter; and (i) transmitting the transmit signals on different transmit channels.

In another illustrative embodiment, a multi-lane communications transceiver includes: multiple receivers, one or more adaptation modules, an alignment detection module, one or more extraction modules, one or more training controllers, an alignment marker insertion module, and multiple transmitters. Each of the multiple receivers receives and demodulates a receive signal from a corresponding receive channel to provide a data stream corresponding to one lane of a multi-lane receive data stream. The one or more adaptation modules derive error measurements from the receive signals and responsively determine remote pre-equalizer adaptation information. The alignment marker detection module detects alignment markers in each lane of the multi-lane receive data stream. The one or more extraction modules extract local pre-equalizer adaptation information from the multi-lane receive data stream, said adaptation information being included in, or proximate to, the alignment markers in at least one lane of the multi-lane receive data stream. The one or more training controllers update coefficients of local pre-equalization filters using the local pre-equalizer adaptation information. The alignment marker insertion module periodically inserts an alignment marker in each lane of a multi-lane transmit data stream, wherein the remote pre-equalizer adaption information is included in, or inserted proximate to, the alignment markers in at least one lane of the multi-lane transmit data stream. Each of the multiple transmitters modulates a data stream corresponding to one lane of the multi-lane transmit data stream and applies one of said local pre-equalization filters to provide a transmit signal to a corresponding transmit channel.

Each of the foregoing embodiments may be implemented individually or in combination, and may be implemented with any one or more of the following features in any suitable combination: (1) the remote pre-equalizer adaptation information and the local pre-equalizer adaptation information each identifies at least one filter coefficient and a change to be applied to the identified at least one filter coefficient. (2) the remote pre-equalizer adaptation information includes a field for indicating status of one or more coefficients of the local pre-equalization filter, and the local pre-equalizer adaptation information includes a field for indicating status of one or more coefficients of the remote pre-equalization filter. (3) said converting includes applying a forward error correction (FEC) decoder, and said transforming includes applying an FEC encoder to the multi-lane transmit data stream before said modulating. (4) each lane of the multi-lane transmit data stream and the multi-lane receive data stream includes adaptation information. (5) only one lane of the multi-lane transmit data stream and the multi-lane receive data stream includes adaptation information. (6) one or more redundant copies of the local adaptation information are associated with each alignment marker in at least one lane of the multi-lane receive data stream. (7) the local adaptation information is modulated with a symbol set having an increased minimum distance and/or an increased symbol period relative to the multi-lane receive data stream's symbol set for conveying user data. (8) the local pre-equalization filter has more than four taps. (9) prior to said receiving and transmitting, the method comprises conducting pre-equalization filter training on each transmit channel independently by: (a) obtaining a receive training signal; (b) converting the receive training signal into a sequence of receive training frames, wherein said converting the receive training signal includes demodulation and training error measurement; (c) extracting local pre-equalizer filter training information from a control field in each receive training frame; (d) using the local pre-equalizer filter training information to adjust one or more coefficients of the local pre-equalization filter; (e) determining remote pre-equalizer training information based at least in part on the training error measurement; (f) generating a sequence of transmit training frames, each transmit training frame including a control field and a training pattern, the control field including the remote pre-equalizer training information; (g) transforming the sequence of transmit training frames into a transmit training signal, wherein said transforming the sequence includes modulating and further includes applying the local pre-equalization filter; and (h) sending the transmit training signal. (10) a coefficient select portion of the control field in each receive training frame and each transmit training frame is wide enough to identify at least 64 coefficients. (11) a forward error correction (FEC)

decoder that decodes the data streams from the multiple receivers to provide the multi-lane receive data stream. (12) an FEC encoder that encodes the multi-lane transmit data stream to provide said data streams to the multiple transmitters for modulation. (13) the one or more training controllers implement independent training phases on each transmit channel prior to sending and receiving of transmit and receive signals conveying multi-lane transmit and receive data streams. (14) during the training phases, the one or more training controllers generate sequences of transmit training frames each including a control field and a training pattern, the control field including remote pre-equalizer training information.

Figure 1:
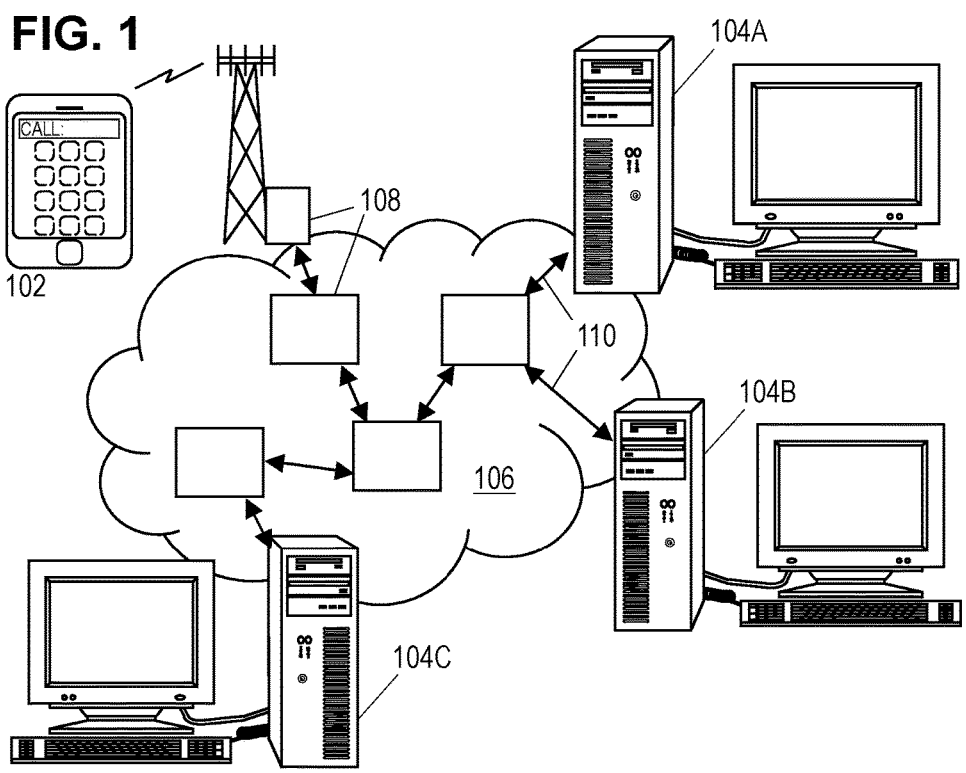
FIG. 1 shows an illustrative communications network.

It should be understood, however, that the specific embodiments given in the drawings and detailed description do not limit the disclosure. On the contrary, they provide the foundation for one of ordinary skill to discern the alternative forms, equivalents, and modifications that are encompassed in the scope of the appended claims.

DETAILED DESCRIPTION

The disclosed apparatus and methods are best understood in the context of the larger environments in which they operate. Accordingly, FIG. 1 shows an illustrative communications network 100 including mobile devices 102 and computer systems 104A-C coupled via a routing network 106. The routing network 106 may be or include, for example, the Internet, a wide area network, or a local area network. In FIG. 1, the routing network 106 includes a network of equipment items 108, such as switches, routers, and the like. The equipment items 108 are connected to one another, and to the computer systems 104A-C, via point-to-point communication links 110 that transport data between the various network components. At least some of the links 110 in network 106 are high-speed multi-lane links such as Ethernet links operating in compliance with the IEEE Std 802.3-2015 (or later) at 10 Gb/s or more.

Figure 2:
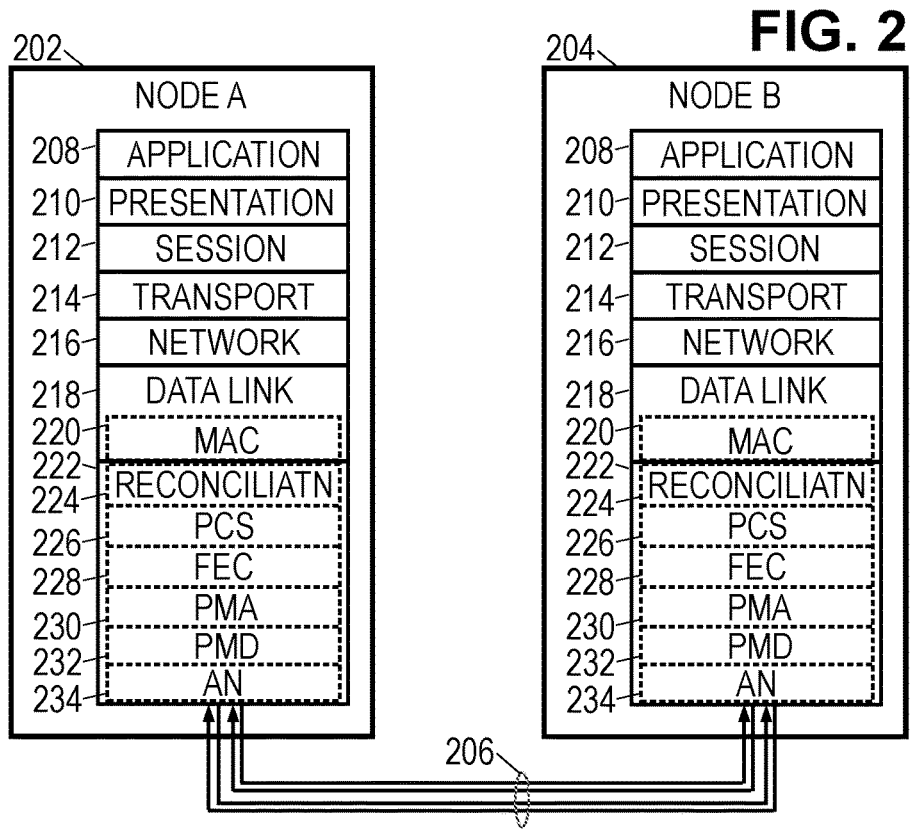
FIG. 2 is a diagram of a point-to-point multi-lane communications link model.

FIG. 2 shows a point-to-point communications link between two nodes 202, 204, that operate in accordance with the ISO/IEC Model for Open Systems Interconnection (See ISO/IEC 7498-1:1994.1) to communicate over a physical medium represented by transmit and receive channels 206. The interconnection reference model employs a hierarchy of layers with defined functions and interfaces to facilitate the design and implementation of compatible systems by different teams or vendors. While it is not a requirement, it is expected that the higher layers in the hierarchy will be implemented primarily by software or firmware operating on programmable processors while the lower layers may be implemented as application-specific hardware.

The Application Layer 208 is the uppermost layer in the model, and it represents the user applications or other software operating on different systems (e.g., equipment 108), which need a facility for communicating messages or data. The Presentation Layer 210 provides such applications with a set of application programming interfaces (APIs) that provide formal syntax, along with services for data transformations (e.g., compression), establishing communication sessions, connectionless communication mode, and negotiation to enable the application software to identify the available service options and select therefrom. The Session Layer 212 provides services for coordinating data exchange including: session synchronization, token management, full- or half-duplex mode implementation, and establishing, managing, and releasing a session connection. In connectionless mode, the Session Layer may merely map between session addresses and transport addresses.

The Transport Layer 214 provides services for multiplexing, end-to-end sequence control, error detection, segmenting, blocking, concatenation, flow control on individual connections (including suspend/resume), and implementing end-to-end service quality specifications. The focus of the Transport Layer 214 is end-to-end performance/behavior. The Network Layer 216 provides a routing service, determining the links used to make the end-to-end connection and when necessary acting as a relay service to couple together such links. The Data link layer 218 serves as the interface to physical connections, providing delimiting, synchronization, sequence and flow control across the physical connection. May detect and optionally correct errors that occur across the physical connection. The Physical layer 222 provides the mechanical, electrical, functional, and procedural means to activate, maintain, and deactivate channels 206, and to use the channels 206 for transmission of bits across the physical media.

The Data Link Layer 218 and Physical Layer 222 are subdivided and modified slightly by IEEE Std 802.3-2015, which provides a Media Access Control (MAC) Sublayer 220 in the Data Link Layer 218 to define the interface with the Physical Layer 222, including a frame structure and transfer syntax. Within the Physical Layer 222, the standard provides a variety of possible subdivisions such as the one illustrated in FIG. 2, which includes an optional Reconciliation Sublayer 224, a Physical Coding Sublayer (PCS) 226, a Forward Error Correction (FEC) Sublayer 228, a Physical Media Attachment (PMA) Sublayer 230, a Physical Medium Dependent (PMD) Sublayer 232, and an Auto-Negotiation (AN) Sublayer 234.

The optional Reconciliation Sublayer 224 merely maps between interfaces defined for the MAC Sublayer 220 and the PCS Sublayer 226. The PCS Sublayer 226 provides scrambling/descrambling, data encoding/decoding (with a transmission code that enables clock recovery and bit error detection), block and symbol redistribution, alignment marker insertion/removal, and block-level lane synchronization and deskew. The FEC Sublayer 228 provides, e.g., Reed-Solomon coding/decoding that distributes data blocks with controlled redundancy across the lanes to enable error correction.

The PMA Sublayer 230 provides lane remapping, symbol encoding/decoding, framing, and octet/symbol synchronization. The PMD Sublayer 232 specifies the transceiver conversions between transmitted/received channel signals and the corresponding bit (or digital symbol) streams. The AN Sublayer 234 implements an initial start-up of the communications channels 206, conducting an auto-negotiation phase and a link-training phase before entering a normal operating phase. The auto-negotiation phase enables the end nodes to exchange information about their capabilities, and the training phase enables the end nodes to adapt both transmit-side and receive-side equalization filters in a fashion that combats the channel non-idealities. In practice, the FEC, PMA, PMD, and AN Sublayers may be tightly integrated, making their delineation uncertain perhaps making them more properly regarded as a combined sublayer.

More information regarding the operation of the sublayers, as well as the electrical and physical specifications of the connections between the nodes and the communications medium (e.g., pin layouts, line impedances, signal voltages & timing), arrangements of the communications medium (e.g., the network topology), and the electrical and physical specifications for the communications medium itself (e.g., conductor arrangements in copper or fiber optic cable, limitations on attenuation, propagation delay, signal skew), can be found in the standard. The discussion below focuses on modifications specific to the present disclosure.

Figure 3:
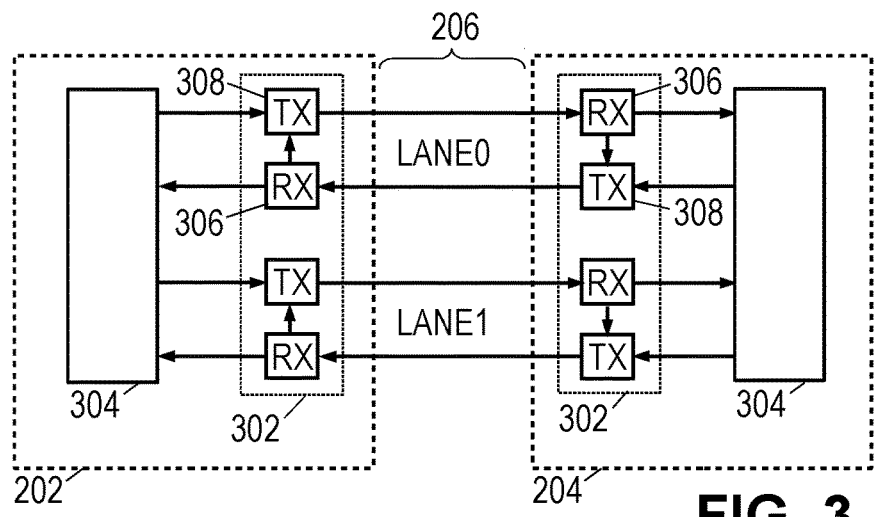
FIG. 3 is a block diagram of an illustrative point-to-point communications link.

FIG. 3 provides a block diagram of those portions of nodes 202, 204, that may implement the Data Link Layer 218 and Physical Layer 222. Transceivers 302 for multiple transmit and receive channels are coupled to a host interface 304. The transceivers 302 and host interface 304 may be, e.g., part of a network interface peripheral coupled to the I/O bus of a personal computer, server, network switch, or other network-connected electronic system. The host interface 304 may implement the MAC Sublayer, optional Reconciliation Sublayer, PCS Sublayer, and elements of the FEC, PMA, and PMD Sublayers, as application-specific circuitry to enable high-rate processing and data transmission. The illustrated transceivers 302 include multiple pairs of a receiver 306 and transmitter 308, each pair coupled to two unidirectional channels (a receive channel and a transmit channel) to implement one lane of a multi-lane physical connection. The physical connection thus accepts from each node transmit signals representing a multi-lane transmit stream and conveys the signals to the other node, delivering them as receive signals representing a multi-lane receive data stream. The receive signals may be degraded due to the physical channel's introduction of noise, attenuation, and signal dispersion.

Figure 4:
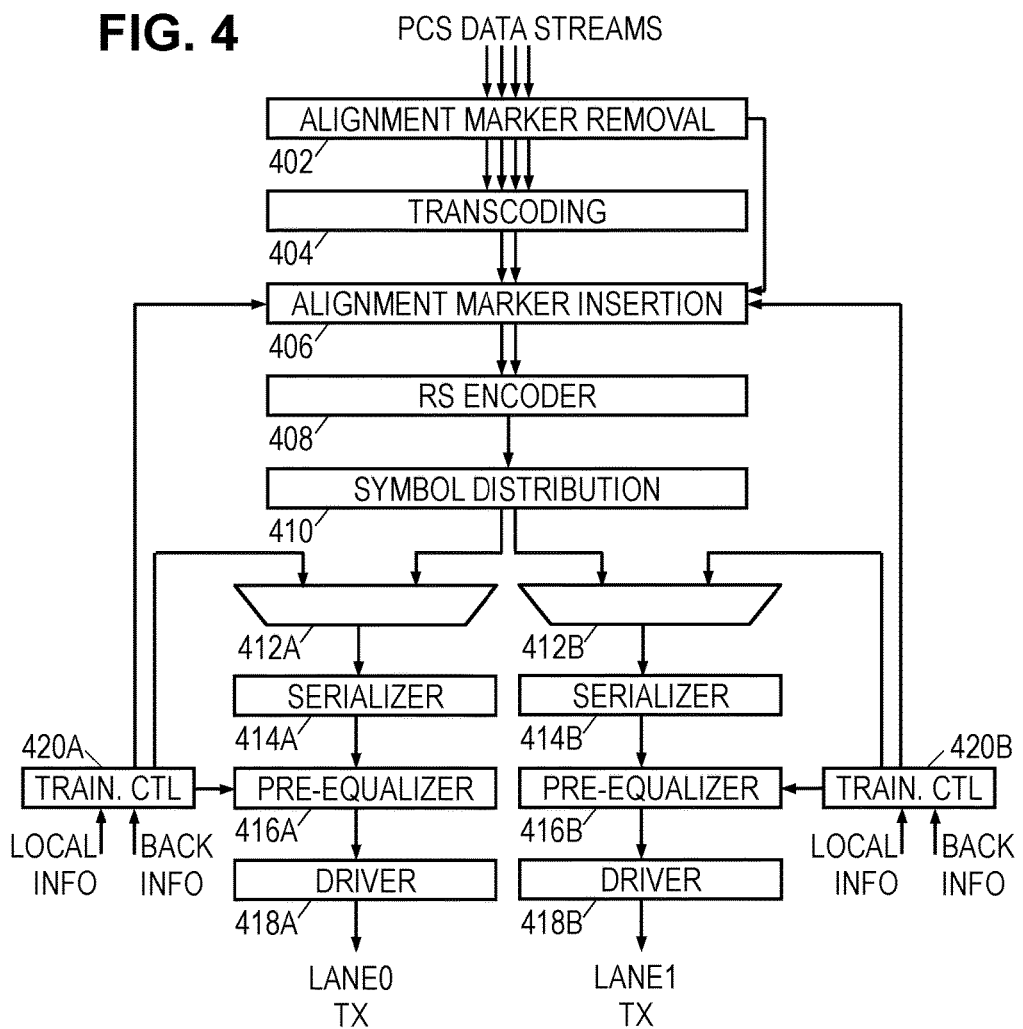
FIG. 4 is a block diagram of a transmit chain in an illustrative multi-lane transceiver.
Figure 5:
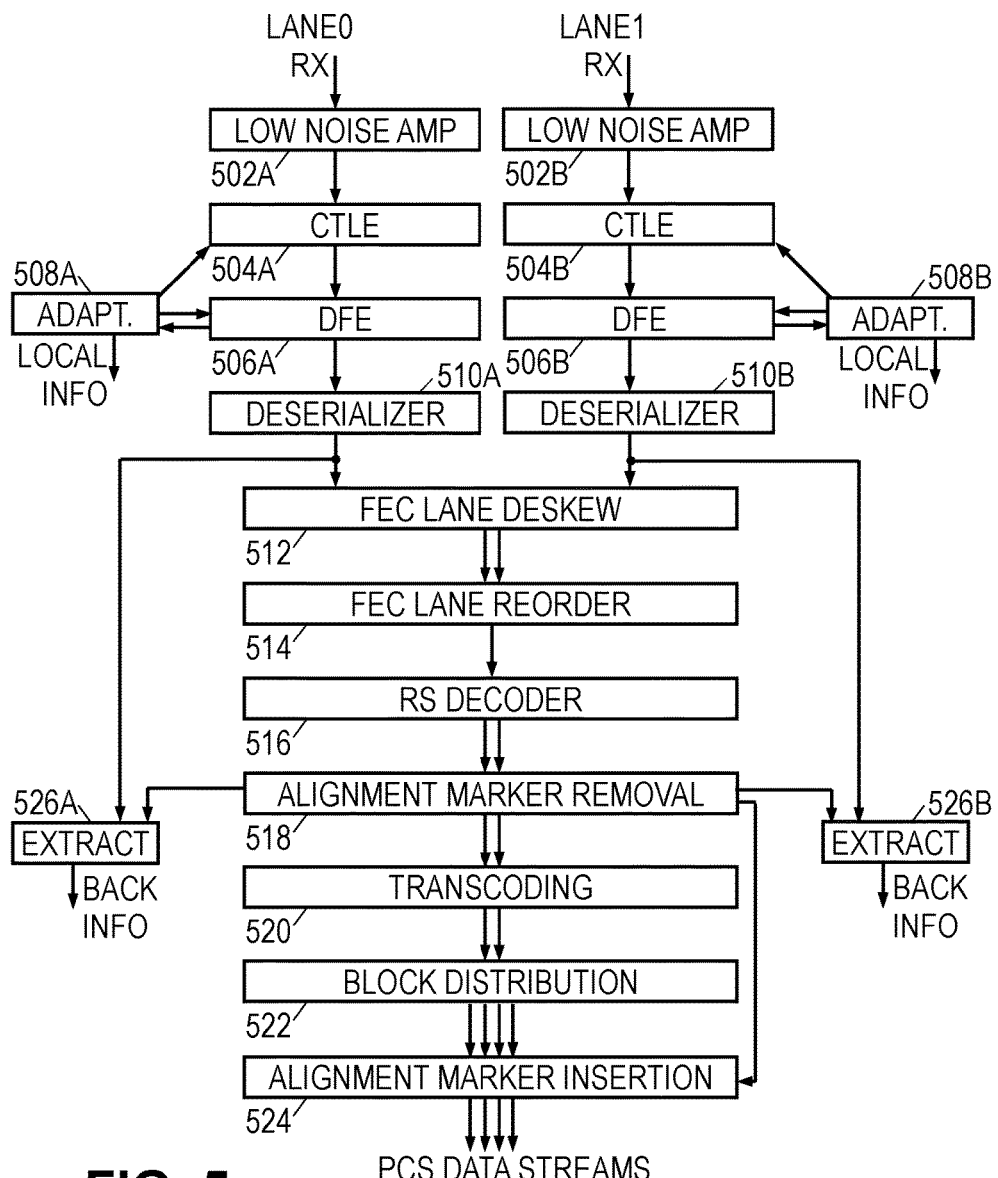
FIG. 5 is a block diagram of a receive chain in an illustrative multi-lane transceiver.

FIGS. 4 and 5 provide a more detailed block diagram of illustrative transmit and receive chains in the sublayers below the PCS. The transmit chain in FIG. 4 accepts four data streams from the PCS. Pursuant to the standard, the PCS data streams are encoded with a transmission code that provides DC balance and enables timing recovery. The PCS data streams further include alignment markers for synchronizing the data streams with each other. Once the data streams are aligned, an alignment marker removal module 402 removes the alignment markers from the PCS data streams, but passes them to a downstream alignment marker insertion module 406. A transcoding module 404 modifies the transmission code from a 64b/66b code to a 256b/257b code more appropriate for use with the FEC scheme. In the process, the four PCS data streams are converted into a multi-lane transmit data stream having only two lanes.

The previously-mentioned alignment marker insertion module 406 compensates for the operation of the transcoding module 404 to re-insert the previously-removed alignment markers at their desired positions and in their desired sequence, in the process creating an alignment marker block 702 (described with reference to FIG. 7 below). As discussed further below, the reinserted alignment markers may be augmented with pre-equalizer adaptation information.

Blocks of the multi-lane data stream (including the alignment marker blocks) are supplied to a Reed-Solomon (RS) encoder module 408, which introduces controlled redundancy to enable downstream correction of symbol errors. It is worth noting that the encoder module 408 can operate by adding redundancy information to the multi-lane data stream (so-called "parity" information) while otherwise preserving the original data stream, so that the alignment markers inserted prior to the encoding module may remain present in the output data-stream from the encoder module.

A symbol distribution module 410 distributes code word symbols across multiple transmission lanes, each lane directed to a corresponding transmitter. During normal operations, multiplexers 412A, 412B forward the encoded data streams to serializer modules 414A, 414B. (During auto-negotiation and training phases, the multiplexers supply negotiation and training data streams to the serializers.) The serializers 414A, 414B, each accept a stream of transmit data blocks and convert the stream of blocks into a (higher-rate) stream of channel symbols. Where, for example, a 4-PAM signal constellation, each serializer may produce a stream of two-bit symbols.

Each stream of channel symbols is filtered by a pre-equalizer module 416A, 416B to produce a transmit signal, which is amplified and supplied to the transmit channel by a driver 418A, 418B. The pre-equalizer modules compensate for at least some of the channel dispersion, reducing or eliminating the need for receiver-side equalization. Such pre-equalization may be advantageous in that it avoids the noise enhancement often associated with receiver-side equalization and enables digital filtering with a reduced bit-width. The bit width reduction directly reduces power consumption by requiring a less complex filter, but may further reduce power consumption by obviating the parallelization that a more complex filter might require to operate at the required bandwidth. However, pre-equalization generally requires knowledge of the channel.

One or more training controllers 420A, B, operate to characterize the channel after conducting an initial auto-negotiation phase. During the auto-negotiation phase, at least one training controller generates a sequence of auto-negotiation frames conveying capabilities of the local node to the remote node and negotiating to select a combination of features to be used for subsequent communications. When the auto-negotiation phase is complete, each training controller generates a sequence of training frames, so that training is carried out independently on each of the lanes.

Figure 6A:
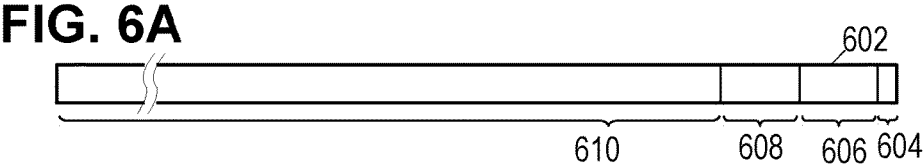
FIGS. 6A-6C show fields of an illustrative training frame.

An illustrative training frame 602 is now described with reference to FIGS. 6A-6C. The training frame 602 begins with a frame marker 604 indicating the start of the training frame. The frame marker 604 is followed by a coefficient update field 606, a status report field 608, and a training pattern 610. Unlike the training pattern, which provides a spectrally-dense channel symbol sequence to facilitate training, the preceding fields are sent using differential Manchester encoding to facilitate timing recovery and ensure reliable communication even with untrained equalizers.

Figure 6B:
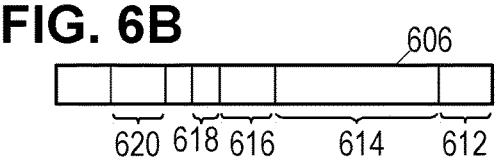

FIG. 6B shows an illustrative coefficient update field 606, having a two-bit request field 612 to indicate whether a selected coefficient should be incremented, decremented, maintained at the present value, or disabled; a six-bit selection field 614 to select one of up to 64 pre-equalizer coefficients; a two-bit modulation field 616 to select a desired modulation scheme (e.g., 2-PAM, 4-PAM, with or without precoding); a one-bit filter length field 618 to indicate whether the pre-equalization filter should be short (no more than four coefficients) or long (more than four coefficients); and a two-bit initialization request field 620 to select a pre-programmed set of pre-equalization coefficient values. The unlabeled fields may be reserved for future use. The training controller(s) may use the coefficient update field 606 to convey backchannel information, i.e., adjustments to the pre-equalization filter coefficients of the remote transmitter.

Figure 6C:
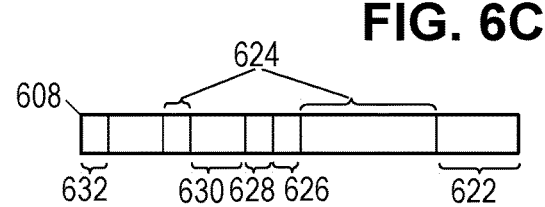

FIG. 6C shows an illustrative status report field 608, having a three-bit coefficient status field 622 to report a successful update to a coefficient, an unsuccessful update, or an error condition (e.g., coefficient not supported, maximum voltage or coefficient limit reached); a one-bit and five-bit (totaling six bit) coefficient selection echo field 624 to echo back the coefficient selection from the remote node; a one bit initial condition status field 626 to report successful or unsuccessful setting of the coefficient values to an initial set of preprogrammed values; a one-bit lock status field 628 to indicate whether the receiver has achieved frame lock; a modulation status field 630 to report which modulation scheme is being employed by the transmitter; and a one-bit receiver ready field 632 to indicate whether the local node has finished training and is ready to begin data transmission. The training controller(s) may use the status report field 608 to convey confirmations and other local status information to the remote node.

Returning to FIG. 4, the one or more training controllers 420A, B, receive backchannel information extracted by the receiver from the received data stream and use the backchannel information to adjust the coefficients of the pre-equalization filters. The controllers further receive "local info", which includes locally-generated information for adapting the coefficients of the pre-equalization filter in the remote node. Based on this information the controllers populate the coefficient selection field 614 and request field 612 of the training frames to provide backchannel information to the remote node. As training frames are employed only during the training phase, and as it may be desirable to continue updating the pre-equalization filter during normal operations, the training controller(s) 420 may include similar backchannel information in or with the alignment markers inserted by module 406 during normal operations.

Figure 7:
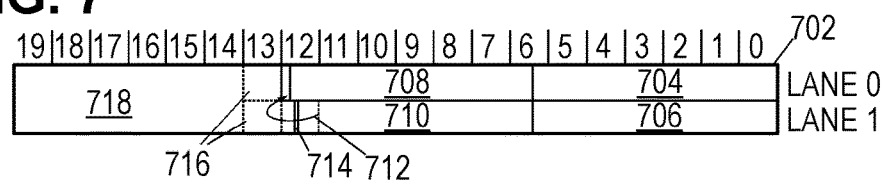
FIG. 7 show alignment markers in an illustrative multi-lane data stream.

FIG. 7 shows an illustrative alignment marker block 702 having the four PCS data stream alignment markers 704, 706, 708, 710, removed by module 402, their contents preserved and aligned within the two-lane alignment marker block 702. As the 66-bit markers don't naturally align with the 10-bit RS code symbols, a portion of marker 710 may be excerpted from position 712 and used to achieve symbol alignment in Lane 0. A 1-bit pad 714 may be added to bring the collection of alignment markers up to 257 bits (the word length of the transmission code).

While each alignment marker includes an interleaved bit parity field that is preferably preserved by the insertion module 406, the module may nevertheless make certain adjustments to the alignment markers, e.g., by using the same lane-specific marker pattern for both markers 704 and 706 to simplify the process of aligning the lanes at the receiver. While alignment makers 708, 710 could in theory be used to make the process more robust, their presence may be unnecessary except to convey the contents of their interleaved bit parity fields. As the lane-specific patterns for markers 708, 710 are known and likely unused, a portion of such patterns may be omitted to make room for backchannel information. Alternatively, one or more other fields 716 may be set aside in the alignment marker block 702 to convey the backchannel information. The remainder 718 of the marker block may be employed to convey data, or alternatively, may be occupied by a predefined fill pattern.

As with the training frame, the backchannel information field(s) of the alignment marker may provide a six-bit field for selecting pre-equalization filter coefficients; a two-bit field for specifying that the selected coefficient should be incremented, decremented, maintained, or disabled; and perhaps a one-bit field for indicating whether the backchannel information field contains a valid command or should be ignored. The backchannel information field(s) may further provide a status report, with a six-bit field for echoing a filter coefficient selection; a two-bit field for indicating whether the coefficient has been updated, not updated, is at its limit, or is not supported; and perhaps a one-bit field for indicating that the receiver has obtained a lock on the lane alignments.

As with the training frame, the backchannel information fields of the alignment marker may be encoded using differential Manchester encoding to ensure reliable delivery. Additionally or alternatively, reliability of the backchannel information field delivery may be enhanced using other techniques. For example, the backchannel information field may be sent redundantly, using multiple copies of the field to enable error detection and (for three or more copies) voting-based error correction. (Notably, a standard-compliant alignment marker may include a bitwise-inverted duplication of each element, which can be extended to include the backchannel information field. If an odd number of copies is desired, the last field may be partly inverted.) A parity check or short FEC code may also provide controlled redundancy enabling the detection and possible correction of bit errors. Such reliability enhancement may be desirable for transceiver embodiments that omit FEC encoding and decoding.

Having discussed the transmit chain and the fields potentially employed to communicate backchannel information during the training and normal operations phases, we turn now to the operation of an illustrative receive chain such as that shown in FIG. 5. The receive chain obtains analog electrical signals from different receive channels (indicated by Lane0-rx and Lane1-rx). These may be obtained directly from electrical conductors, if the physical medium is an electrical bus or cable, or indirectly via transducers if the physical medium is wireless. Low noise amplifiers (LNA) 502A,B, each provide a high input impedance to minimize channel loading and amplifies the receive signal to drive the input of a continuous time linear equalizer (CTLE) filter 504A,B.

CTLE filters 504A,B provide continuous time filtering to shape the receive signal spectrum in an adaptive fashion to reduce the length of the channel impulse response while minimizing leading inter-symbol interference (ISI). Decision feedback equalizers (DFE) 506A,B operate on the filtered signals to correct for trailing ISI and detect each transmitted channel bit or symbol, thereby producing a demodulated digital data stream. Some embodiments employ oversampling. Clock recovery and adaptation modules 508A,B derive a sampling clock signal from the input and/or output of the DFE's decision element and supply it back to the DFE to control timing of the symbol detection. The adaptation modules 508A,B further derive an error signal of the DFE decision element's input relative to the output or (during the training phase) a known training pattern, and use the error signal to adapt the DFE coefficient(s) and the response of the CTLE filters. The adaptation modules still further use the error signal to generate "local info", i.e., adaptation information for the remote pre-equalizer. This local info is supplied to the training controller(s) 420 (FIG. 4).

Deserializers 508A,B groups the digital data stream bits or symbols into blocks to enable the use of lower clock rates for subsequent on-chip operations. During training operations, the deserializer outputs are processed only by the backchannel information extraction modules 526A,B, which extract the pre-equalizer adaptation information and status report information and provide them to the training controller(s) 420.

During normal operations, the receive data streams from the deserializers are aligned by an FEC lane deskew module 512. If the FEC lanes have somehow gotten switched, an FEC lane reordering module 514 detects the switch based on the contents of the alignment markers and corrects the switch. An RS decoder module 516 detects and corrects any symbol errors in the multi-lane receive data stream, removing the FEC coding redundancy during the decoding process.

An alignment marker removal module 518 removes the alignment markers inserted at the transmitter by module 406, providing them to extraction modules 526A,B, and to downstream alignment marker insertion module 524. During normal operations, extraction modules obtain the backchannel information conveyed in or adjacent to the alignment markers and convey it to the training controller(s) 420.

A transcoding module 520 converts the 256b/257b transmission code words into blocks of four 64b/66b transmission code words, and block distribution module 522 distributes the blocks appropriately across four PCS lanes. An alignment marker insertion module 524 periodically inserts alignment markers at appropriate positions in the four lanes, accounting for the transcoding and distribution operations. The PCS lanes are provided to the higher hierarchy layers of the node for eventual communication of the conveyed data to the destination application.

The illustrative transmit and receive embodiments of FIGS. 4-5 include FEC encoding and decoding. However, alternative embodiments may omit FEC. In such alternative embodiments, or even in embodiments that do employ FEC, the transmit chain's modification of alignment markers may occur after the multi-lane transmit data stream has been divided into individual lanes, e.g., just before the serializer; and the receive chain's modification of alignment markers may occur before the individual lanes are combined into a multi-lane receive data stream, e.g., just after the deserializer. If the transceiver (PMD Sublayer) includes alignment marker detection/locking and modification or extraction, the disclosed techniques may be implemented entirely within the transceivers and need not require modification of the FEC Sublayer.

With a sufficiently long pre-equalization filter, the DFE feedback filter may be kept quite short, at say 1 or 2 taps, and even when the channel has a relatively lengthy channel response, the pre-equalization filter may obviate any need for a digital feed forward equalizer (FFE) filter. In this case, the power savings associated with this architecture is expected to be substantial. With temperature changes and general evolution of the channel, however, ongoing adaptation of the pre-equalization filter (i.e., during the normal operations phase) is expected to be necessary.

Figure 8:
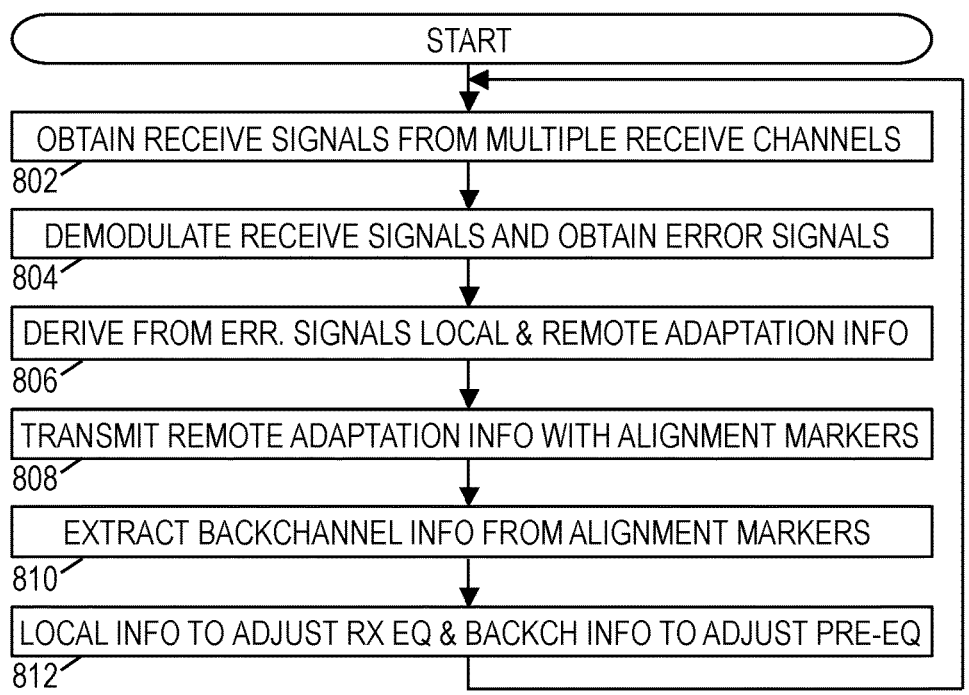
FIG. 8 is a flowchart of an illustrative multi-lane communications method.

FIG. 8 is a flow diagram of the illustrative method. In block 802, the transceiver obtains receive signals on different receive channels. In block 804, the receive signals are demodulated, e.g., with a DFE, to obtain error signals. The demodulated data streams are later combined to form a multi-lane data stream carrying user data to a destination application. In block 806, adaptation information is derived from the error signal in accordance with any applicable adaptation algorithm that may be found in the open literature. The adaptation information may be applicable to the CTLE filter, any FFE filter that may be present, and the feedback filter of the DFE (referred to herein as "local" adaptation info), as well as to the pre-equalization filter of the remote node (referred to herein as "remote" adaptation info). In block 808, the remote adaptation info is embedded in a backchannel information field of alignment markers periodically inserted into a multi-lane transmit data stream. In block 810, the contents of the backchannel information field are extracted from received alignment markers, yielding adaptation information for the local pre-equalizer. In block 812, the local adaptation information and the backchannel information are used to adjust the receive equalizers (CTLE, DFE, and FFE if any) and the local transmit pre-equalizer.

Numerous alternative forms, equivalents, and modifications will become apparent to those skilled in the art once the above disclosure is fully appreciated. For example, the foregoing description suggests specific locations and bit-widths for fields, yet any suitable location and width that can be standardized and agreed upon may be employed. It is intended that the claims be interpreted to embrace all such alternative forms, equivalents, and modifications that are encompassed in the scope of the appended claims.

What is claimed is:

1. A multi-lane communication method that comprises, in a transceiver:
   receiving receive signals on different receive channels;
   converting each of the receive signals into a lane of a multi-lane receive data stream, wherein said converting includes demodulation and error measurement;
   determining remote pre-equalizer adaptation information based at least in part on the error measurement;
   using alignment markers in each lane of the multi-lane receive data stream to align the lanes;
   extracting local pre-equalizer adaptation information from the multi-lane receive data stream, said adaptation information being included in, or proximate to, the alignment markers in at least one lane of the multi-lane receive data stream;
   using the local pre-equalizer adaptation information to adjust one or more coefficients of a local pre-equalization filter;
   periodically inserting an alignment marker in each lane of a multi-lane transmit data stream, wherein the remote pre-equalizer adaption information is included in, or inserted proximate to, the alignment markers in at least one lane of the multi-lane transmit data stream;
   transforming each lane of the multi-lane transmit data stream into a transmit signal, wherein said transforming includes modulating and further includes applying the local pre-equalization filter; and
   transmitting the transmit signals on different transmit channels.

2. The method of claim 1, wherein the remote pre-equalizer adaptation information and the local pre-equalizer adaptation information each identifies at least one filter coefficient and a change to be applied to the identified at least one filter coefficient, and wherein the remote pre-equalizer adaptation information includes a field for indicating status of one or more coefficients of the local pre-equalization filter, and the local pre-equalizer adaptation information includes a field for indicating status of one or more coefficients of the remote pre-equalization filter.

3. The method of claim 1, wherein said converting includes applying a forward error correction (FEC) decoder, and wherein said transforming includes applying an FEC encoder to the multi-lane transmit data stream before said modulating.

4. The method of claim 1, wherein each lane of the multi-lane transmit data stream and the multi-lane receive data stream includes adaptation information.

5. The method of claim 1, wherein only one lane of the multi-lane transmit data stream and the multi-lane receive data stream includes adaptation information.

6. The method of claim 1, wherein one or more redundant copies of the local adaptation information are associated with each alignment marker in at least one lane of the multi-lane receive data stream.

7. The method of claim 1, wherein the local adaptation information is modulated with a symbol set having an increased minimum distance and/or an increased symbol period relative to the multi-lane receive data stream's symbol set for conveying user data.

8. The method of claim 1, wherein local adaptation information is transmitted with duplication or forward error correction (FEC) encoding.

9. The method of claim 8, wherein prior to said receiving and transmitting, the method comprises conducting pre-equalization filter training on each transmit channel independently by:
  obtaining a receive training signal;
  converting the receive training signal into a sequence of receive training frames, wherein said converting the receive training signal includes demodulation and training error measurement;
  extracting local pre-equalizer filter training information from a control field in each receive training frame;
  using the local pre-equalizer filter training information to adjust one or more coefficients of the local pre-equalization filter;
  determining remote pre-equalizer training information based at least in part on the training error measurement;
  generating a sequence of transmit training frames, each transmit training frame including a control field and a training pattern, the control field including the remote pre-equalizer training information;
  transforming the sequence of transmit training frames into a transmit training signal,
  wherein said transforming the sequence includes modulating and further includes applying the local pre-equalization filter; and
  sending the transmit training signal.

10. The method of claim 9, wherein a coefficient select portion of the control field in each receive training frame and each transmit training frame is wide enough to identify at least 64 coefficients.

11. A communications transceiver that comprises:
  multiple receivers, each receiver receiving and demodulating a receive signal from a corresponding receive channel to provide a data stream corresponding to one lane of a multi-lane receive data stream;
  one or more adaptation modules that derive error measurements from the receive signals and responsively determine remote pre-equalizer adaptation information;
  a deskew module that uses alignment markers in each lane of the multi-lane receive data stream to align the lanes;
  one or more extraction modules that extract local pre-equalizer adaptation information from the multi-lane receive data stream, said adaptation information being included in, or proximate to, the alignment markers in at least one lane of the multi-lane receive data stream;
  one or more training controllers that update coefficients of local pre-equalization filters using the local pre-equalizer adaptation information;
  an alignment marker insertion module that periodically inserts an alignment marker in each lane of a multi-lane transmit data stream, wherein the remote pre-equalizer adaption information is included in, or inserted proximate to, the alignment markers in at least one lane of the multi-lane transmit data stream;
  multiple transmitters, each transmitter modulating a data stream corresponding to one lane of the multi-lane transmit data stream and applying one of said local pre-equalization filters to provide a transmit signal to a corresponding transmit channel.

12. The transceiver of claim 11, wherein the remote pre-equalizer adaptation information and the local pre-equalizer adaptation information each identifies at least one filter coefficient and a change to be applied to the identified at least one filter coefficient, and wherein the remote pre-equalizer adaptation information includes a field for indicating status of one or more coefficients of the local pre-equalization filter, and the local pre-equalizer adaptation information includes a field for indicating status of one or more coefficients of the remote pre-equalization filter.

13. The transceiver of claim 11, further comprising:
  a forward error correction (FEC) decoder that decodes the data streams from the multiple receivers to provide the multi-lane receive data stream; and
  an FEC encoder that encodes the multi-lane transmit data stream to provide said data streams to the multiple transmitters for modulation.

14. The transceiver of claim 11, wherein each lane of the multi-lane transmit data stream and the multi-lane receive data stream includes adaptation information.

15. The transceiver of claim 11, wherein only one lane of the multi-lane transmit data stream and the multi-lane receive data stream includes adaptation information.

16. The transceiver of claim 11, wherein one or more redundant copies of the local adaptation information are associated with each alignment marker in at least one lane of the multi-lane receive data stream.

17. The transceiver of claim 11, wherein the local adaptation information is modulated with a symbol set having an increased minimum distance and/or an increased symbol period relative to the multi-lane receive data stream's symbol set for conveying user data.

18. The transceiver of claim 11, wherein the local adaptation information is sent redundantly or with forward error correction (FEC) encoding.

19. The transceiver of claim 18, wherein the one or more training controllers implement independent training phases on each transmit channel prior to sending and receiving of transmit and receive signals conveying multi-lane transmit and receive data streams, and wherein during the training phases, the one or more training controllers generate sequences of transmit training frames each including a control field and a training pattern, the control field including remote pre-equalizer training information.

20. The transceiver of claim 19, wherein a coefficient select portion of the control field in each transmit training frame is wide enough to identify at least 64 coefficients of a remote pre-equalization filter.

* * * * *